United States Patent [19]

Yatsu et al.

[11] Patent Number: 4,675,373

[45] Date of Patent: Jun. 23, 1987

[54] POLYHYDROXY POLYETHER, PROCESS FOR ITS PRODUCTION, AND ITS USE

[75] Inventors: Tadao Yatsu; Etsuji Ishimaru, both of Iwakuni; Kimiyoshi Miura, Ohtake, all of Japan

[73] Assignee: Mitsui Petrochemical Industries, Ltd., Tokyo, Japan

[21] Appl. No.: 852,575

[22] Filed: Apr. 16, 1986

[30] Foreign Application Priority Data

Apr. 18, 1985 [JP] Japan .................................. 60-81313
Oct. 28, 1985 [JP] Japan ................................ 60-239558

[51] Int. Cl.$^4$ ...................... C08G 59/06; C08G 59/02
[52] U.S. Cl. ................................... 528/103; 528/104; 528/110
[58] Field of Search ....................... 528/103, 104, 110

[56] References Cited

U.S. PATENT DOCUMENTS 3,567,677 3/1971 Webb ............................. 528/103 X
4,419,467 12/1983 Wismer et al. .................. 528/110 X
4,608,313 8/1986 Hickner et al. ................. 528/103 X

*Primary Examiner*—Earl Nielsen
*Attorney, Agent, or Firm*—Sherman and Shalloway

[57] ABSTRACT

A substantially linear polyhydroxy polyether, which (1) is composed substantially of aromatic units and aliphatic units, the proportion of the aromatic units being 50 to 98 mole % based on the total amount of the aromatic units and the aliphatic units, (2) has an intrinsic viscosity, measured at 25° C. in o-chlorophenol, of from 0.3 to 2 dl/g, and (3) has a glass transition, temperature of from 30° to 120° C. Two processes for preparing the polyhydroxy polyether are proposed. The polyhydroxy polyether is useful in applications which require gas-barrier property.

7 Claims, No Drawings

POLYHYDROXY POLYETHER, PROCESS FOR ITS PRODUCTION, AND ITS USE

This invention relates to a polyhydroxy polyether having superior melt-moldability, mechanical strength, transparency and gas-barrier property suitable for use as a material for containers, a process for its production, and to its use.

Glass has widely been used as a material for containers used in holding seasonings, oils, beer, wines and liquors, carbonated beverages, cosmetics, detergents, etc. Glass containers have excellent gas barrier property, but since the cost of their production is high, it has been the usual practice to recover empty containers, and use them recyclically. The heavy weight of the glass containers, however, adds to the transportation expenses, and they have other defects such as susceptibility to breakage and inconvenient handling.

To remove these defects, glass containers have recently been superseded by various plastic containers, and various plastic materials have been used according to the kind of articles to be held by such containers and the purpose for which such containers are used. Polyethylene terephthalate as such a plastic material has been used as a material for containers holding seasonings, carbonated beverages, detergents, cosmetics, etc. because of its excellent gas-barrier property and transparency. Polyethylene terephthalate, however, has not proved to be entirely satisfactory for use in containers which hold beer and carbonated beverage and are therefore most rigorously required to have gas-barrier property. In such an application, the present practice is to increase the wall thickness of the polyethylene terephthalate containers in an attempt to impart increased gas-barrier property. There has been an increasing demand for polyester containers, but to broaden their utility, it has been strongly desired to develop a polyester having excellent gas-barrier property and melt-moldability.

Japanese Laid-Open Patent Publication No. 64624/1984 discloses a polyisophthalate such as poly(ethylene isophthalate) and its copolymer as a packaging material having low permeability to oxygen and carbon dioxide gas, and molded articles prepared therefrom.

Japanese Laid-Open Patent Publication No. 67049/1984 filed by the same applicant as the above-cited laid-open patent publication discloses a multilayer packaging material composed of a layer of the aforesaid polyisophthalate or its copolymer and a layer of a polyterephthalate such as poly(ethylene terephthalate) or its copolymer, and molded articles prepared therefrom, such as a bottle.

Japanese Laid-Open Patent Publication No. 39547/1984 discloses a multilayer container having excellent gas-barrier property comprising an innermost layer of a polyester comprising ethylene terephthalate as main recurring units and outer layers of a polyester comprising ethylene isophthalate as main recurring units, wherein that part of the container which has a small wall thickness is oriented in at least one direction.

A material other than polyesters is shown in Japanese Laid-Open Patent Publication No. 36296/1973 which discloses a polyamide having good transparency composed of m-xylylenediamine or a mixture of it with p-xylylenediamine as a diamine component and a mixture of a particular aromatic dicarboxylic acid and a particular aliphatic dicarboxylic acid as a dicarboxylic acid component. This patent document describes that the polyamide shows good impact strength and has excellent processability, but fails to describe anything on its bas-barrier property.

Japanese Laid-Open Patent Publication No. 64866/1981 discloses a multilayer container comprising an outermost layer of a polyester comprising ethylene terephthalate units as main recurring units, an innermost layer of a polyester comprising ethylene terephthalate units as main recurring units, and an interlayer of a polyamide derived from m-xylylenediamine or a mixture of it with p-xylylenediamine as a diamine component, wherein that part of the container which has a small thickness is oriented in at least one direction. The patent document describes that the container has excellent oxygen-barrier property without deteriorating the excellent dynamic properties, transparency, and chemical resistance of the polyester.

Japanese Laid-Open Patent Publication No. 183243/1983 discloses a biaxially stretch-blow molded bottle comprising an inner and an outer surface layer of polyethylene terephthalate and an interlayer of a mixture of polyethylene terephthalate and a xylylene group-containing polyamide.

U.S. Pat. No. 4,383,101 and European Laid-Open Patent Publication No. 0033049 and Japanese Laid-Open Patent Publication No. 100,828/1981 which correspond to the U.S. Pat. No. disclose that a linear hydroquinone phenoxy polymer produced from hydroquinone and an epihalohydrin is characterized by having low permeability to oxygen and carbon dioxide.

Journal of Applied Polymer Science, Vol. 7, pages 2135–2144 (1963) discloses the gas-barrier properties of homopolyhydroxyethers represented by the following formula (A)

$$+O-E-O-CH_2-\underset{OH}{CH}-CH_2\xrightarrow{}_x \qquad (A)$$

wherein E is 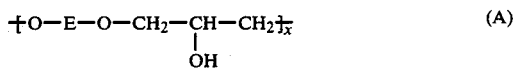,

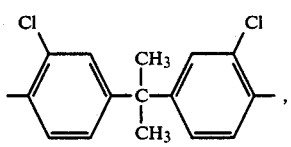,

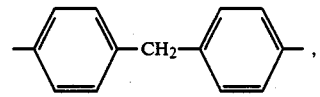,

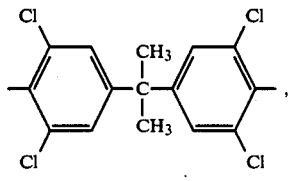,

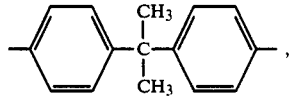,

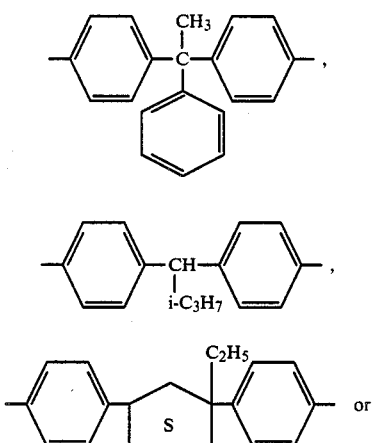

A homopolyhydroxy ether of formula (A) having the lowest permeability to oxygen is one having formula (A) in which E is p-phenylene, and its oxygen permeability is 0.5 cc mil/100 in²/2 hr/atm (0.197 ml.mm/m².day.atom). Polymers of formula (A) having the lowest water vapor permeability are those of formula (A) in which E is

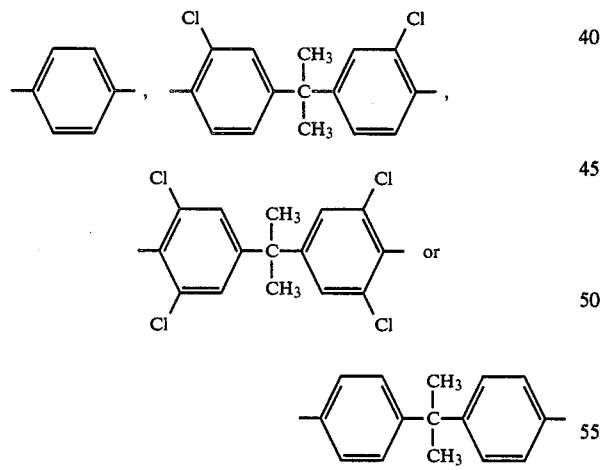

and their water vapor permeability is 3 g-mil/100 in²/24 hr at 100° F. and 90% RH.

Journal of Applied Polymer Science, Vol. 7, pages 2145–2152 (1963 discloses the gas-barrier properties of copolyhydroxypolyether of formula (B)

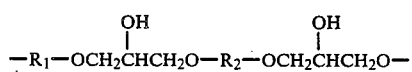

(B)

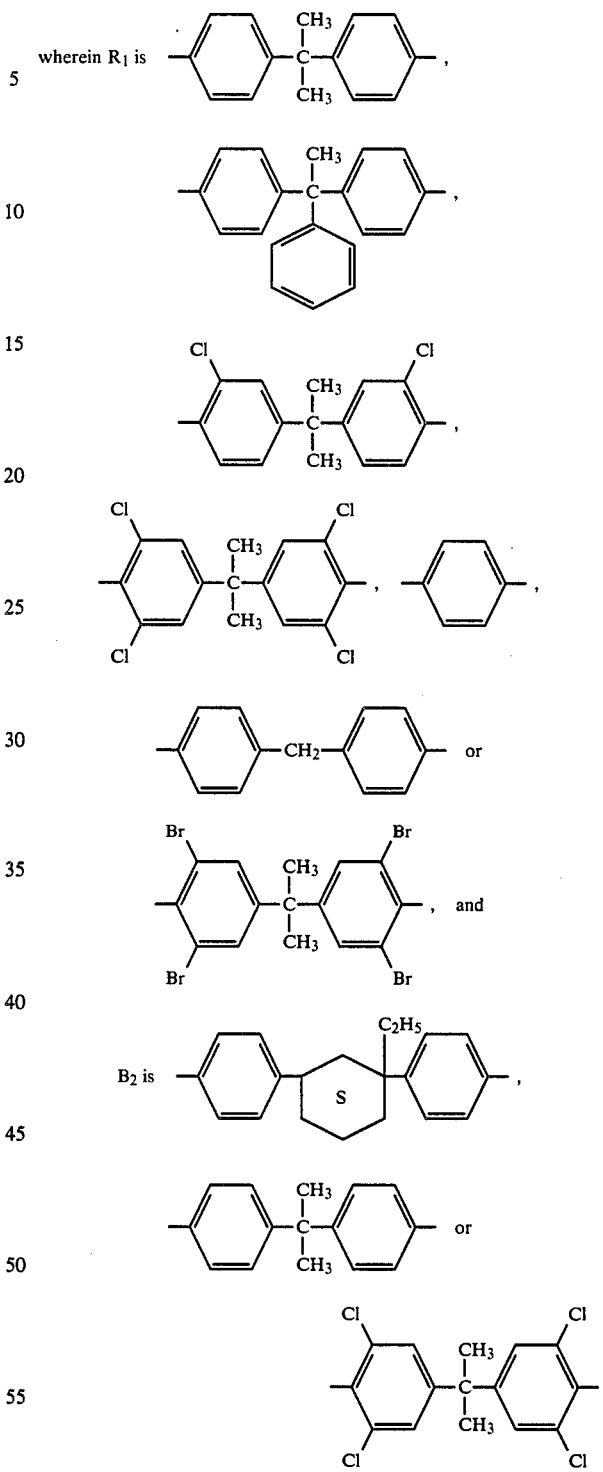

wherein $R_1$ and $R_2$ are not identical. Polymers of formula (B) in which $R_1$ is -continued R₂ is , and R₁ is  and R₂ is 

have the lowest oxygen permeability which is 5 g-ml/100 in²/24 hr/atm. Polymers of formula (B) in which R₁ is

 and

R₂ is ,

R₁ is  and

R₂ is , and

R₂ is 

have the lowest water vapor permeability which is 4 g/ml/100 in²/24 hr at 100° F. and 90% RH.

It is an object of this invention to provide a novel polyhydroxy polyether.

Another object of this invention is to provide a polyhydroxy polyether having superior gas-barrier property, particularly superior oxygen- and carbon dioxide-barrier properties.

Still another object of this invention is to provide a polyhydroxy polyether having excellent melt moldability and stretchability.

Yet another object of this invention is to provide a process for producing the novel polyhydroxy polyether.

A further object of this invention is to use the polyhydroxy polyether as a material for containers which require gas-barrier property.

Additional objects of this invention along with its advantages will become apparent from the following description.

According to the present invention, the above objects and advantages are firstly achieved by a substantially linear polyhydroxy polyether which (1) is composed substantially of aromatic units represented by the following formula (I)-A

 (I)-A wherein $R^1$ represents a divalent aromatic hydrocarbon group composed mainly of a p-phenylene group, and aliphatic units represented by the following formula (I)-B

 (I)-B wherein $R^2$ represents a divalent aliphatic hydrocarbon group having 2 to 6 carbon atoms, and p is a positive number of from 1 to 20, the proportion of the aromatic units being 50 to 98 mole % based on the total amount of the aromatic units and the aliphatic units, (2) has an intrinsic viscosity, measured at 25° C. in o-chlorophenol, of from 0.3 to 2 dl/g, and (3) has a glass transition temperature of from 30° to 120° C.

According to this invention, the polyhydroxy polyether of the invention can be produced by a process which comprises reacting (a) a polyhydroxy polyoxide represented by the general formula (II)

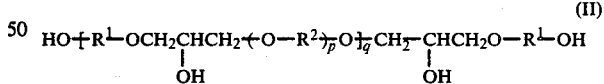 (II)

wherein $R^1$ represents a divalent aromatic hydrocarbon group composed of a p-phenylene group as a main component, $R^2$ represents a divalent aliphatic hydrocarbon group having 2 to 6 carbon atoms, p represents a positive number of from 1 to 20, and q is a positive number, (b) an aromatic diol represented by the following formula (III)

HO—$R^1$—OH     (III)

wherein $R^1$ is as defined above, and (c) an epihalohydrin, in a two-phase mixed solvent composed of water and an organic solvent in the presence of a base and/or a phase-transfer catalyst (first process).

Alternatively, the polyhydroxy polyether of this invention can be produced by a process of this invention which comprises reacting (a') an aromatic diol represented by the general formula (III)

  (III)

wherein $R^1$ represents a divalent aromatic hydrocarbon group composed of a p-phenylene group as a main component, (b') a diglycidyl ether of an aromatic diol represented by the general formula (IV)

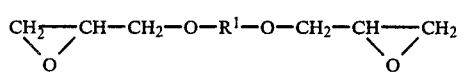  (IV)

wherein $R^1$ is as defined, and (c') a diglycidyl ether of an aliphatic diol represented by the general formula (V)

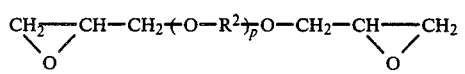  (V)

wherein $R^2$ represents a divalent aliphatic hydrocarbon group having 2 to 6 carbon atoms, and p is a positive number of from 1 to 20, in the presence of at least one catalyst selected from the group consisting of tertiary amines, quaternary ammonium compounds, tertiary phosphines and quaternary phosphonium compounds (second process).

The first process of this invention will be described in detail.

In this process, the polyhydroxy polyoxide of formula (II) is used as one starting material. In formula (II), $R^1$ represents a divalent aromatic hydrocarbon group having a p-phenylene group as a main component. $R^1$ may be a p-phenylene group or a mixture of a major proportion of a p-phenylene group with another divalent aromatic hydrocarbon group. Examples of the other divalent aromatic hydrocarbon group which may be present in a proportion of not more than 50 mole %, preferably not more than 40 mole %, based on the p-phenylene group include

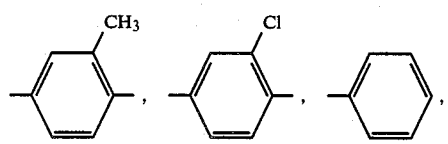

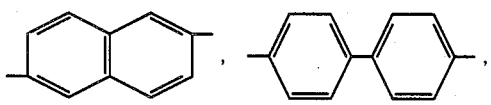

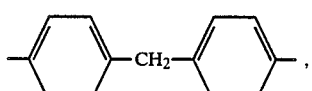

-continued

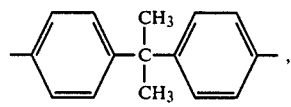

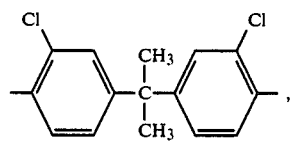

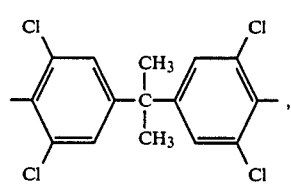

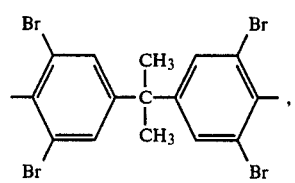

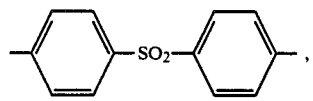

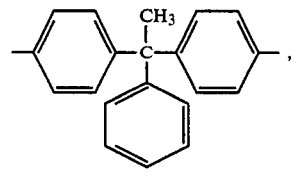

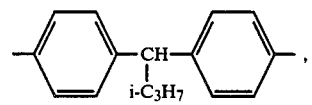

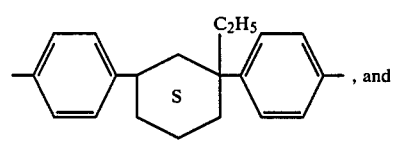, and

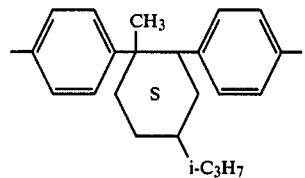

In formula (II), $R^2$ is a divalent aliphatic hydrocarbon group having 2 to 6 carbon atoms which may be linear or branched. Examples include 1,2-dimethylene, 1,3-trimethylene, 1,4-tetramethylene, 1,5-pentamethylene, 1,6-hexamethylene, 1,2-propylene, and 2,2-dimethyl-1,3-propylene groups.

In formula (II), p is a positive number of from 1 to 20, and q is a positive number.

Examples of the polyhydroxy polyoxide of formula (II) are shown below.

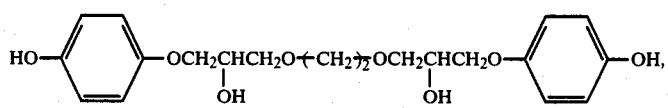
(200)
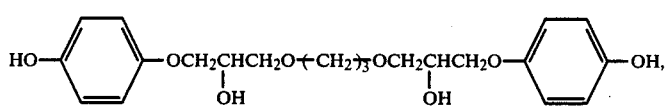
(202)
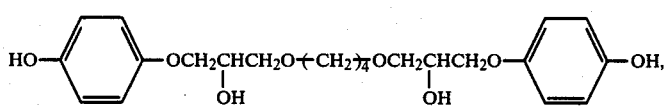
(204)
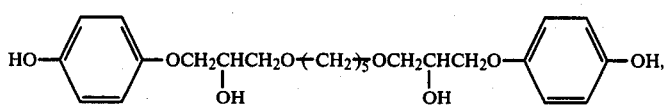
(206)
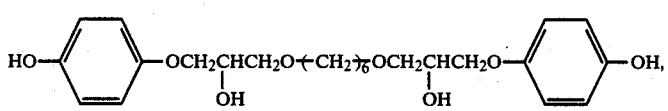
(208)
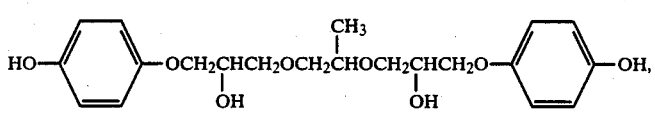
(210)
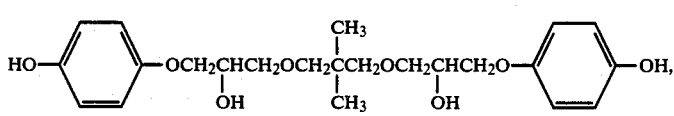
(212)
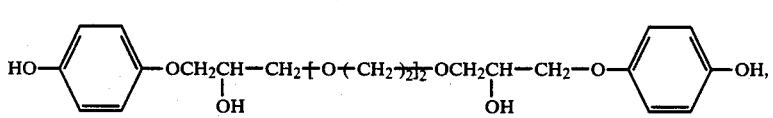
(214)
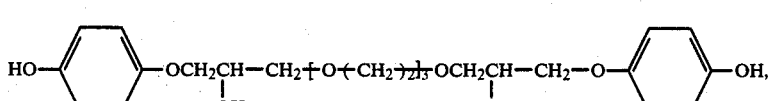
(216)
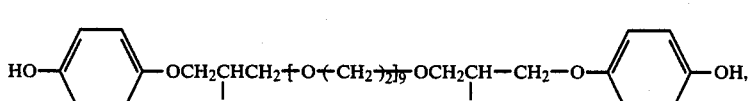
(218)
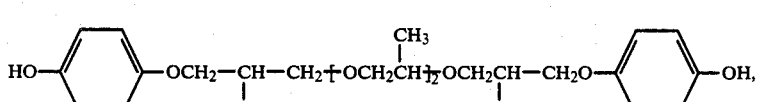
(220)
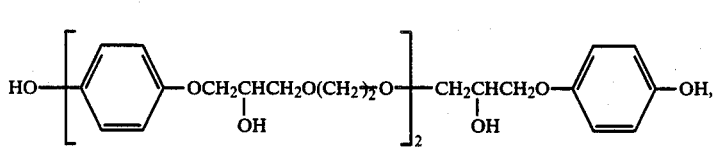
(222)
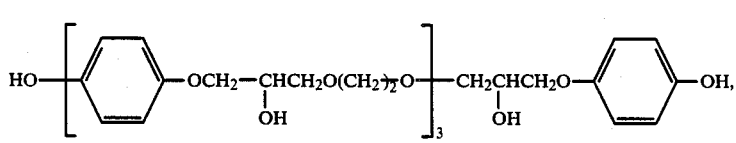
(224)
Examples of the polyhydroxy polyoxide which may be used together with the above compound in which $R^1$ is a p-phenylene group are the following compounds.

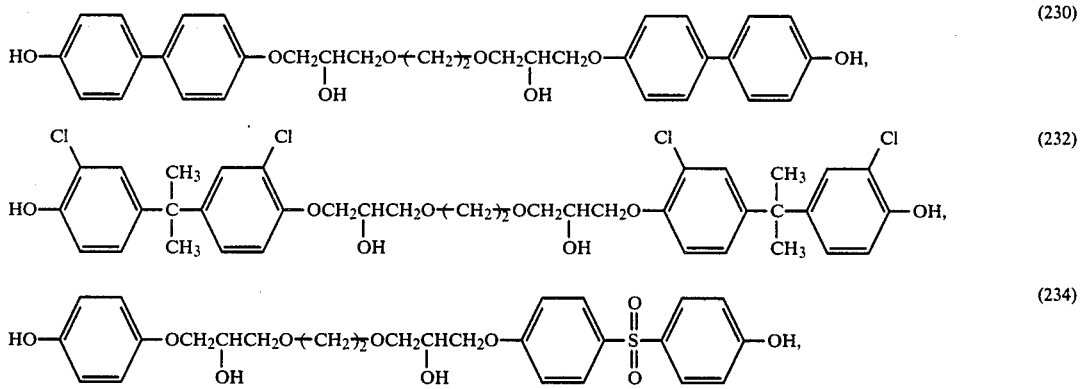

The compound of formula (II) can be produced by reacting an aliphatic diol of the following formula (IV)

$$HO-R^2-OH \quad (VI)$$

wherein $R^2$ is as defined hereinabove,
with an epihalohydrin represented by the following formula (VII)

wherein X is a halogen atom,
in the presence of a basic compound to form a diepoxide of the following formula (VIII)

wherein $R^2$ is as defined above,
and reacting the diepoxide with an aromatic diol represented by the following formula (III)

$$HO-R^1-OH \quad (III)$$

wherein $R^1$ is as defined,
in the presence of a basic compound.

The diepoxide of formula (VIII) obtained from the aliphatic diol and epihalohydrin may contain a small amount of halogen derived from the starting epihalohydrin, or may further contain a small amouint of a diepoxide of the following formula (IX)

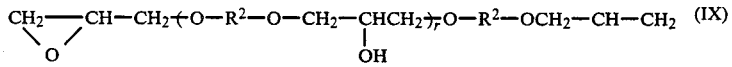

wherein $R^2$ is as defined above, and r is a positive number,
resulting from the reaction of the diepoxide of formula (VIII) with the aliphatic diol of formula (VI) and the epihalohydrin of formula (VI), or a monoepoxide of the following formula (X)

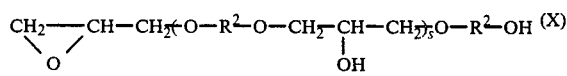

wherein $R^2$ is as defined, and s is 0 or a positive number, in which one terminal is composed of an aliphatic diol component unit. Furthermore, the diepoxide of formula (VIII) may contain a small amount of an epoxy compound such as a monoepoxide of an aliphatic polyol having at least 3 hydroxy groups in an amount which maintains the resulting polyhydroxy polyoxide substantially linear.

Since the first process of this invention is carried out in the presence of a basic compound as shown below, the diepoxide of formula (VIII) and the aromatic diol of formula (III) may be used instead of the polyhydroxy polyoxide of formula (III) so that the polyhydroxy polyoxide is formed in situ in the reaction system.

The aromatic diol used as another starting material in the first process of this invention and the aromatic diol used to produce the polyhydroxy polyoxide of formula (II) are represented by formula (III) above. In formula (III), $R^1$ represents a divalent aromatic hydrocarbon group having a p-phenylene group as a main component, and its examples are the same as those given above with regard to formula (II). Specific examples of the compound of formula (III) are therefore hydroquinone or mixtures of hydroquinone with other aromatic dihydroxy compounds such as resorcinol, methylhydroquinone, chlorohydroquinone, bisphenol A, dichlorobisphenol A, tetrachlorobisphenol A, tetrabromobisphenol A, bisphenol F, bisphenol ACP, bisphenol L, bisphenol V and bisphenol S.

Epichlorohydrin and epibromohydrin are preferred as the epihalohydrin used as one starting material in the first process of this invention and as the epihalohydrin used for the production of the polyhydroxy polyoxide of formula (II).

The first process of this invention is carried out by reacting the polyhydroxy polyoxide, the aromatic diol and the epihalohydrin in the presence of a base and/or a phase transfer catalyst in a two-phase mixed solvent composed of water and an organic solvent.

The epihalohydrin is used preferably in an amount of 0.95 to 1.05 moles per mole of the polyhydroxy polyoxide (II) and the aromatic diol (III) combined.

Preferably, the base includes sodium hydroxide, potassium hydroxide, lithium hydroxide, tetraalkyl ammonium hydoxides, and alkali metal alcoholates. Preferred tetraalkyl ammonium hydroxides are tetramethyl ammonium hydroxide and tetraethyl ammonium hydroxide. Examples of suitable alkali metal alcoholates are sodium, potassium and lithium salts of lower alcohols such as methanol, ethanol, isopropanol and tert-butanol.

Examples of the phase transfer catalyst include quaternary ammonium halides such as methyl tricapryl ammonium chloride, benzyl triethyl ammonium chloride and tetrabutyl ammonium bromide; quaternary ammonium sulfates such as methyl tricapryl ammonium sulfate; and quaternary ammonium acetates such as benzyl triethyl ammonium acetate. Illustrative of organic solvents that can be used in the first process of this invention are methyl isobutyl ketone, cyclohexanone, 2-butanone, acetophenone, dichloromethane, gamma-butyrolactone, sulfolane, dimethyl sulfoxide, N-methyl-2-pyrrolidone and N,N-dimethylformamide.

Water is used in an amount of, for example, 1 to 10 parts by weight per part by weight of the polymer to be formed. The organic solvent is used in an amount of, for example, 1 to 10 parts by weight on the same basis.

The reaction is carried out usually at a temperature of about 50° to 180° C., preferably about 70° to 150° C., in the presence of, for example, about 0.001 to 0.2 mole, per mole of the polyhydroxy polyoxide and the aromatic diol combined, of the catalyst. The reaction usually ends in 1 to 10 hours. After the reaction, the resulting polymer is isolated from the reaction mixture by methods known per se.

Now, the second process of this invention will be described in detail.

The aromatic diol of formula (III) used as one starting material is the same as the aromatic diol described hereinabove with regard to the first process.

The diglycidyl ether of an aromatic diol used as another starting material in the second process is represented by formula (IV). In formula (IV), $R^1$ represents a divalent aromatic hydrocarbon group having a p-phenylene group as a main component. Examples of $R^1$ will be clear from the examples of $R^1$ in formula (II) or (III) given above.

Accordingly, the diglycidyl ether of formula (IV) is composed mainly of a diglycidyl ether of hydroquinone represented by the following formula.

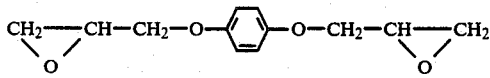

Examples of the aromatic diol diglycidyl ether represented by formula (IV) which can be used together with the hydroquinone diglycidyl ether are as follows:
(400) 1,4-diglycidyloxy-2-methylbenzene,
(402) 1,4-diglycidyloxy-2-chlorobenzene,
(404) 1,3-diglycidyloxybenzene,
(406) 2,6-diglycidyloxynaphthalene,
(408) 4,4'-diglycidyloxybiphenyl,
(410) 4,4'-diglycidyloxydiphenylether,
(412) 4,4'-diglycidyloxydiphenylsulfide,
(414) 4,4'-diglycidyloxydiphenylsulfone,
(416) 4,4'-diglycidyloxydiphenylmethane,
(418) 2,2-bis(4-glycidyloxyphenyl)propane,
(420) 1,1-bis(4-glycidyloxyphenyl)-1-phenylethane,
(422) 2,2-bis(4-glycidyloxy-3,5-dichlorophenyl)propane,
(424) 2,2-bis(4-glycidyloxy-3,5-dibromophenyl)propane,
(426) 4,4'-diglycidyloxy-3,3',5,5'-tetrachlorodiphenylmethane, and
(428) 2,2-bis(4-glycidyloxy-3,5-dimethylphenyl)propane.

The aromatic diol diglycidyl ether represented by formula (IV) can be produced by reacting the aromatic diol of formula (III) with the epihalohydrin of formula (VII) in the presence of a basic compound by methods know per se.

The diglycidyl ether (c') of an aliphatic diol which can be used as another starting material in the second process of this invention is represented by the general formula (V). In formula (V), $R^2$ is a divalent aliphatic hydrocarbon group having 2 to 6 carbon atoms which may be linear. Examples include 1,2-dimethylene, 1,3-trimethylene, 1,4-hexamethylene, 1,2-propylene, and 2,2-dimethyl-1,3-propylene groups. In formula (V), p is a positive number of from 1 to 20.

Examples of the aliphatic dioldiglycidyl ether represented by formula (V) are given below:
(500) ethylene glycol diglycidyl ether,
(502) trimethylene glycol diglycidyl ether,
(504) tetramethylene glycol diglycidyl ether,
(506) pentamethylene glycol diglycidyl ether,
(508) hexamethylene glycol diglycidyl ether,
(510) 1,2-propanediol diglycidyl ether,
(512) neopenty glycol diglycidyl ether,
(514) di(ethylene glycol)diglycidyl ether,
(516) tri(ethylene glycol)diglycidyl ether,
(518) nona(ethylene glycol)diglycidyl ether,
(520) di(1,2-propanediol)diglycidyl ether.

The diglycidyl ether of formula (V) can be produced by reacting an aliphatic diol of the following formula (XI)

wherein $R^2$ and p are as defined above,
with the epihalohydrin of formula (VII) in the presence of a basic compound.

The diglycidyl ether of formula (V) prepared from the aliphatic diol and the epihalohydrin may contain a small amount of halogen derived from the starting epihalohydrin, or a monoglycidyl ether of the aliphatic diol with the epihalohydrin, or a diglycidyl ether of an oligomer of the aliphatic diol.

The second process of this invention is carried out by reacting the aromatic diol (III), the aromatic diol diglycidyl ether (IV), and the aliphatic diol diglycidyl ether (V) in the presence of at least one catalyst selected from the group consisting of tertiary amines, quaternary ammonium compounds, tertiary phosphines and quaternary phosphonium compounds.

The aromatic diol diglycidyl ether and the aliphatic diol diglycidyl ether are used in a total amount of 0.95 to 1.05 moles, preferably 0.97 to 1.03 moles, more preferably 0.98 to 1.02 moles, per mole of the aromatic diol. There is no particular restriction on the ratio between the aromatic diol diglycidyl ether and the aliphatic diol diglycidyl ether. Preferably, however, the aliphatic diol diglycidyl ether is used in an amount of 0.03 to 0.45 mole, especially 0.04 to 0.4 mole, per mole of the aromatic diol diglycidyl ether.

The tertiary amines used as the catalyst are preferably compounds represented by the following formula (XII)

(XII)

wherein R³, R⁴ and R⁵ are identical or different and each represents a linear or branched alkyl group having 1 to 6 carbon atoms, or a benzyl group. Examples of the tertiary amines include triethylamine, tri-n-propylamine, tri-isopropylamine, tri-n-butylamine, tri-secondary butylamine, tri-n-hexylamine, dimethylbenzylamine, diethylbenzylamine, and tribenzylamine.

The quaternary ammonium compounds as the catalyst are preferably compounds represented by the following formula (XIII)

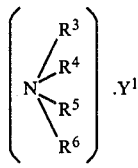
(XIII)

wherein R³, R⁴ and R⁵ are as defined, R⁶ represents a linear or branched alkyl group having 1 to 10 carbon atoms, a phenyl group or a benzyl group, and Y¹ represents a monovalent anion such as a hydroxyl group or a halogen atom. Examples of the quaternary ammonium compounds include quaternary ammonium hydroxide compounds such as tetramethyl ammonium hydroxide, tetraethyl ammonium hydroxide, tetra-n-propyl ammonium hydroxide, tetraisopropylammonium hydroxide, tetra-n-butyl ammonium hydroxide, trimethylbenzyl ammonium hydroxide and triethylbenzyl ammonium hydroxide; tetraammonium halide compounds such as tetramethyl ammonium chloride, tetra-n-propyl ammonium chloride, tetra-n-butyl ammonium chloride, tetra-n-amyl ammonium chloride, trimethylphenyl ammonium chloride, trimethylbenzyl ammonium chloride, triethylbenzyl ammonium chloride, tetramethyl ammonium bromide, tetraethyl ammonium bromide, tetra-n-propylammonium bromide, tetra-n-butyl ammonium bromide, trimethyldecyl ammonium bromide, trimethylphenyl ammonium bromide, trimethylbenzyl ammonium bromide, tetramethyl ammonium iodide, tetraethyl ammonium iodide, tetra-n-propyl ammonium iodide, trimethylphenyl ammonium iodide and trimethylbenzyl ammonium iodide.

The tertiary phosphines as the catalyst are preferably compounds represented by the following formula (XIV)

(XIV)

wherein R⁷, R⁸ and R⁹ are identical or different and each represents a linear or branched alkyl group having 1 to 10 carbon atoms, a benzyl group, a phenyl group, or a phenyl group substituted by an alkyl group having 1 to 10 carbon atoms. Examples of the tertiary phosphines include triethylphosphine, tri-n-butylphosphine, triphenylphosphine and trinonylphenylphosphine.

The quaternary phosphonium compounds as the catalyst are preferably compounds represented by the following formula (XV)

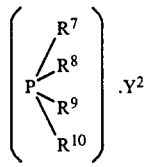
(XV)

wherein R⁷, R⁸ and R⁹ are as defined above, and R¹⁰ is selected from the groups represented by R⁷, R⁸ and R⁹. Examples of the quaternary phosphonium compounds include quaternary phosphonium hydroxide compounds such as tetramethyl phosphonium hydroxide, and quaternary phosphonium halide compounds such as tetramethyl phosphonium chloride, tetra-n-butyl phosphonium chloride, tetramethyl phosphonium chloride, tetra-n-butyl phosphonium chloride, tetraphenyl phosphonium chloride, tetra-n-phosphonium bromide, methylphenyl phosphonium bromide, and n-butyltriphenyl phosphonium bromide.

The suitable amount of the catalyst used is 0.001 to 10 mole%, preferably 0.005 to 5 mole%, more preferably 0.01 to 1 mole%, per mole of the aromatic diol diglycidyl ether.

To stabilize the terminals of the polyhydroxy polyether as a final product, a small amount of a compound containing one phenolic hydroxyl group in the molecule may be added in the second process of this invention. Examples of the compound having one phenolic hydroxyl group are phenol, o-cresol, m-cresol, p-cresol, p-t-butylphenol, p-phenylphenol and p-cumylphenol. This compound is used usually in an amount of not more than 0.05 mole, preferably not more than 0.03 mole, more preferably not more than 0.02 mole, per mole of the aromatic diol diglycidyl ether.

In the second process of the invention, the reaction may be carried out without using a solvent, or in the presence of an inert solvent. Since the use of solvent reduces the viscosity of the reaction mixture, it has the advantage of favorably inhibiting the reaction. Examples of the solvent are saturated hydrocarbons such as n-decane and decahydronaphthalene; aromatic hydrocarbons such as benzene, toluene, xylene, trimethylbenzene, tetramethylbenzene, ethylbenzene, cumene, n-butylbenzene, tetrahydronaphthalene and naphthalene; ketones such as methyl ethyl ketone, methyl isobutylketone, 2-hexanone, cyclohexanone and acetophenone; amides such as N,N-dimethylacetamide and N-methyl-2-pyrrolidone; and sulfoxides such as dimethyl sulfoxide. The solvent is used usually in an amount of not more than 2 parts by weight, preferably not more than 1 part by weight, preferably not more than 0.5 part by weight, per part by weight of the polymer to be produced. After the reaction, the solvent may be separated and removed from the polyhydroxy polyether as a final product by a customary methods such as re-precipitation.

The reaction is carried out usually at about 70° to 270° C., preferably 80° to 250° C. Usually, the reaction is carried out under atmospheric pressure or elevated pressures. When the solvent used for viscosity adjustment is to be removed, it can also be carried out under reduced pressure. Usually, the reaction ends in 0.1 to 10 hours under stirring conditions. The reaction may be carried out in an ordinary reaction vessel either batchwise or continuously. Or a method may be used in which the reaction is carried out in two or more stages. For example, a product having a low molecular weight is produced in a reaction vessel with a low stirring power, and then reacted in a reaction vessel having a higher stirring power to form a high-molecular-weight polyhydroxy polyether. The use of an extruder-type reaction device is also useful for the production of a polyhydroxy polyether of a higher molecular weight. After the reaction, the polyhydroxy polyether is separated from the reaction mixture by methods known per se.

Thus, according to this invention, there is provided a substantially linear polyhydroxy polyether composed substantially of aromatic units represented by the following formula (I)-A

wherein $R^1$ represents a divalent aromatic hydrocarbon group having a p-phenylene group as a main component,
and aliphatic units represented by the following formula (I)-B

wherein $R^2$ represents a divalent aliphatic hydrocarbon group having 2 to 6 carbon atoms, and p is a positive number of 1 to 20,
the proportion of the aromatic units being 50 to 98 mole% based on the aromatic units and the aliphatic units combined.

The polyhydroxy polyether of this invention further has an intrinsic viscosity, measured at 25° C. in o-chlorophenol, of 0.3 to 2 dl/g, and a glass transition temperature of 30° to 120° C. The intrinsic viscosity is measured by the method to be defined hereinbelow. The term "substantially linear" means that the polymer is composed substantially of a linear structure or a chain structure having branched chains. In other words, it means that the polymer is not substantially of a gelled crosslinked structure. This is substantiated by the fact that the polyhydroxy polyether of this invention is substantially completely dissolved in the solvent used in measuring its intrinsic viscosity.

Under the condition that the aromatic units of formula (I)-A and the aliphatic units of formula (I)-B are randomly distributed, the polyhydroxy polyether of this invention can also be expressed by the following formula (I)

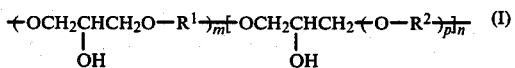

wherein $R^1$, $R^2$ and p are as defined above, and m and n are positive numbers provided that $m/(m+n)$ is in the range of 0.5 to 0.98. The sum of m and n is such a number as to provide an intrinsic viscosity of 0.3 to 2 dl/g. If the intrinsic viscosity of the polyhydroxy polyether is higher than 2 dl/g, its melt moldability and stretchability are reduced. If its intrinsic viscosity is lower than 0.3 dl/g, the polyhydroxy polyether and its stretched product have reduced mechanical strength. Preferably, the polyhydroxy polyether of this invention has an intrinsic viscosity of 0.4 to 1.5 dl/g.

If the glass transition temperature of the polyhydroxy polyether of this invention is lower than 30° C., the polymer is difficult to dry economically. Preferably, the polyhydroxy polyether of this invention has a glass transition temperature of 40° to 110° C.

As is clear from the fact that the $m/(m+n)$ in formula (I) above is in the range of 0.5 to 0.98, the polyhydroxy polyether of the invention contains the divalent aromatic hydrocarbon group ($R^1$) in a larger proportion than the divalent aliphatic hydrocarbon group ($R^2$). The $m/(m+n)$ value is preferably in the range of 0.55 to 0.97, more preferably from 0.6 to 0.96.

The polyhydroxy polyether may have at its terminals hydroquinone units

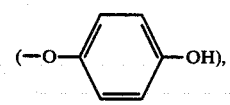

other aromatic diols units (such as

glycerol units

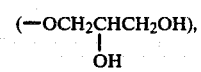

aliphatic diol units (such as $-O(CH_2)_2OH$), aliphatic polyol units, or an epoxy group

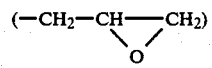

depending upon the proportions of the starting compounds used in is production. These terminal hydroxyl groups (—OH) or epoxy groups

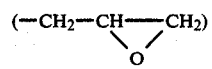

may be converted to a carboxylic acid ester such as an acetic acid ester (—OCOCH$_3$) or an ether such as an ethoxy group (—OC$_2$H$_5$) by en esterification method or etherification method known per se. The polyhydroxy polyether of this invention includes polymers having the various terminals as mentioned above.

The polyhydroxy polyether of this invention usually has a molecular weight distribution, defined by the ratio of its weight average molecular weight ($\overline{Mw}$) to its number average molecular weight ($\overline{Mn}$), ($\overline{Mw}/\overline{Mn}$), of from 1.5 to 10.

Since the polyhydroxy polyether of this invention has excellent gas-barrier property, it can be conveniently used as a material in applications which require gas-barrier peroperty.

The polyhydroxy polyether of this invention may be used in the unstretched state by molding it into a film, a sheet, fibers, a container, or articles of various other shapes by ordinary molding methods. Stretched films, sheets and containers of the polyhydroxy polyether also have excellent gas-barrier property.

A stretched molded article of the polyhydroxy polyether of this invention will be described below at some length.

The stretched article of the polyhydroxy polyether of this invention may be in the monoaxially or biaxially stretched state and in the form of a film, a sheet, or fibers. In the case of the monoaxially stretched article, the stretch ratio is usually 1.1 to 10 times, preferably 1.2 to 8 times, especially preferably 1.5 to 7 times. In the case of the biaxially stretched article, the stretch ratio is usually 1.1 to 8 times, preferably 1.2 to 7 times, specially preferably 1.5 to 6 times in the longitudinal direction, and usually 1.1 to 7 times, preferably 1.2 to 7 times, especially 1.5 to 6 times in the transverse direction.

The stretched article of the polyhydroxy polyether of this invention may, as required, contain suitable amounts of known additives such as an inorganic filler, a lubricant, a slip agent, an antiblocking agent, a stabilizer, an antistatic agent and a pigment.

The stretched article of the polyhydroxy polyether of this invention may be produced by any conventional methods. Generally, for example, an unstretched molded article such as a film or sheet is formed from the polyhydroxy polyether or a composition comprising it and the additives, and as such or after cooling it to a temperature below the glass transition temperature and re-heating it, is stretched at a temperature equal to, or higher than, the glass transition temperature of the polymer, preferably from the glass transition temperature to a point 80° C. higher than it.

When the unstretched molded article is a film or sheet, the stretched article may be produced, for example, by stretching the unstretched film or sheet monoaxially (monoaxial stretching); stretching it in the longitudinal direction and then in the transverse direction (biaxial stretching); stretching it simultaneously in the longitudinal and transverse directions (biaxial stretching); biaxially stretching it and subsequently stretching the stretched article in either direction; biaxially stretching it and then stretching the stretched article in both directions; or by a vacuum-forming method in which the film or sheet is stretched by reducing the pressure of the space between the film or sheet and a mold. The stretched article of the polyhydroxy polyether may also be produced in a form laminated to another resin. Such a product may be produced, for example, by laminating one or more films or sheets of the polyhydroxy polyether to one or more layers of an unstretched molded article, such as a film or sheet, of another resin, and then stretching the laminated structure; or by bonding a film or sheet of another resin to the stretched article of the polyhydroxy polyether.

A laminate composed of a layer of the polyhydroxy polyether of the invention and a layer of a polyalkylene terephthalate composed mainly of ethylene terephthalate units will be described below.

Specific examples of such a laminate include a two-layer laminate composed of a layer of the polyhydroxy polyether and a layer of the polyalkylene terephthalate; a three-layer laminate composed of both outer layers of the polyalkylene terephthalate and an interlayer of the polyhydroxy polyether; a three-layer laminate composed of both outer layers of the polyhydroxy polyether and an interlayer of the polyalkylene terephthalate; a multilayer laminate composed of at least four layers of the polyhydroxy polyether and the polyalkylenee terephthalate laminated alternately with the outermost layers being the polyalkylene terephthalate layers; a multilayer laminate composed of at least four layers of the polyhydroxy polyether and the polyalkylenee terephthalate laminated alternately with the outermost layers being the polyhydroxy polyether layers; and a multilayer laminate composed of at least four layers of the polyhydroxy polyether and the polyalkylenee terephthalate laminated alternately with one outermost layer being the polyalkylene terephthalate layer and the other being the polyhydroxy polyether layer. These laminates may be in the form of sheets, plates, tubes, various hollow structures, containers, and structures of various other shapes. They may be produced by known methods.

The thicknesses of the polyhydroxy polyether layer and the polyalkylene terephthalate layer constituting the laminate are properly determined according to the ultimate uses of the laminates, and are not particularly restricted. In the case of the two-layer laminate, the polyhydroxy polyether layer has a thickness of usually 4 to 350 microns, preferably 6 to 200 microns, and the polyalkylene terephthalate layer has a thickness of 8 to 600 microns, preferably 10 to 500 microns. In the case of the three-layer structure of the first-mentioned type, the polyhydroxy polyether interlayer has a thickness of usually 4 to 350 microns, preferably 6 to 200 microns, and the polyalkylene terephthalate outer layer has a thickness of usually 4 to 300 microns, preferably 5 to 250 microns. In the three-layer laminate of the latter type, the polyalkylene terephthalate interlayer has a thickness of usually 8 to 600 microns, preferably 10 to 500 microns, and the polyhydroxy polyether outer layer has a thickness of usually 4 to 100 microns, preferably 6 to 50 microns. In the case of the multilayer laminate composed of at least four layers, the thicknesses of the polyhydroxy polyether layer and the polyalkylene terephthalate layer either as an interlayer or an outermost layer may be selected in the same way as above.

The polyalkylene terephthalate constituting the laminate is a polyester composed of ethylene terephthalate units as main structural units. The content of the ethylene terephthalate structural units in the polyalkylene terephthalate is usually at least 50 mole %, preferably at least 70 mole %. The dicarboxylic acid component units constituting the polyalkylene terephthalate may include a small amount of units of another aromatic dicarboxylic acid component in addition to the terephthalic acid units. Specific examples of the other aromatic dicarboxylic acid units are units of isophthalic acid, phthalic acid, and naphthalenedicarboxylic acid. The diol component units constituting the polyalkylene terephthalate may contain a small amount of units of another diol component in addition to ethylene glycol component units. Examples of the other diol component units are units of diols having 3 to 15 carbon atoms such as 1,3-propanediol, 1,4-butanediol, neopentyl glycol, cyclohexane diol, cyclohexane dimethanol, 1,4-bis-(beta-hydroxyethoxy)benzene, 1,3-bis(beta-hydroxyethoxy)benzene, 2,2-bis(4-beta-hydroxyethoxyphenyl)propane, and bis(4-beta-hydroxyethoxyphenyl)sulfone.

The polyalkylene terephthalate may, as required, contain a small amount of units of a polyfunctional compound in addition to the aromatic dicarboxylic acid units and the diol units. Specific examples of the polyfunctional compound include aromatic polybasic acids such as trimellitic acid, trimesic acid and 3,3',5,5'-tetracarboxydiphenyl, aliphatic polybasic acids such as butanetetracarboxylic acid, aromatic polyols such as phloroglucinol and 1,2,4,5-tetrahydroxybenzene, aliphatic polyols such as glycerol, trimethylolethane, trimethylolproapne and pentaerthyritol, and hydroxypolycarboxylic acids such as malic acid.

The polyalkylene terephthalate is usually composed of 50 to 100 mole %, preferably 70 to 100 mole %, of the terephthalic acid component units, 0 to 50 mole %, preferably 0 to 30 mole %, of the other aromatic dicarboxylic acid component units, 50 to 100 mole %, preferably 70 to 100 mole %, of the ethylene glycol component units, 0 to 50 mole %, preferably 0 to 30 mole %, of the other diol component units, and 0 to 2 mole %, preferably 0 to 1 mole %, of the polyfunctional compound component units. Usually, the polyalkylene terephthalate has an intrinsic viscosity, measured in a 1:1 by weight mixture of phenol and tetrachloroethane, of 0.5 to 1.5 dl/g, preferably 0.6 to 1.2 dl/g, a melting point of 210° to 265° C., preferably 220° to 260° C., and a glass transition temperature of 50° to 120° C., preferably 60° to 100° C.

The laminates described above can be used in various applications because they have excellent melt-moldability, stretchability, mechanical strength, transparency and gas-barrier property.

Now, a stretched laminate composed of a layer of the polyhydroxy polyether of this invention and a layer of the polyalkylene terephthalate composed mainly of ethylene terephthalate units will be described.

The stretched laminate can be produced by stretching the laminate described above. The stretched laminate may be a monoaxially or biaxially stretched laminate in the form of a film, a sheet, a plate, etc. The stretch ratios described above for the polyhydroxy polyether may be applied directly for producing the stretched laminate. The stretched laminate may be heat-set.

The stretched laminate may be obtained by subjecting the above laminate in the unstretched state to the same stretching treatment as described above for the polyhydroxy polyether.

The stretched laminate can be used in various applications because of its superior mechanical strength, transparency and gas-barrier property.

A preform for producing a multilayer blow-molded article may be produced from a layer of the polyhydroxy polyether layer and a layer of a polyalkylene terephthalate layer having ethylene terephthalate units as main structural units, and have the laminate constructions described hereinabove. Thus, the preform may assume the two-layer structure, there-layer structure, four-layer structures, or a multilayer structure composed of more than four layers as described hereinabove with regard to the laminate. Of these, a preform of a two-layer laminated structure composed of a layer of the polyhydroxy polyether and a layer of the polyalkylene terephthalate, and a preform of a three-layer laminated structure composed of an interlayer of the polyhydroxy polyether and outer layers of the polyalkylene terephthalate layer are preferred because stretched multilayer blow-molded articles prepared from these preforms have excellent mechanical strength, transparency and gas-barrier property.

Both the polyhydroxy polyether and the polyalkylene terephthalate constituting the preforms may contain suitable amounts of various additives incorporated in conventional polyesters, such as an inorganic filler, a lubricant, a slip agent, an antiblocking agent, a stabilizer, an antistatic agent, an antihaze agent and a pigment.

The preforms for multilayer blow-molded articles can be produced by known methods, for example by molding a laminate having the aforesaid laminated structure into a tubular form.

The stretched multilayer blow-molded article may be produced by stretch-blow molding the aforesaid preform. The stretched blow-molded article may be of a two-layer structure composed of a layer of the polyhydroxy polyether and a layer of the polyalkylene terephthalate, a three-layer structure composed of at least one polyhydroxypolyether layer and at least one polyalkylene terephthalate layer laminated alternately, or a multilayer structure composed of four or more layers of the polyhydroxy polyether and the polyalkylene terephthalate laminate alternately.

The stretched multilayer blow-molded article may be a monoaxially or a biaxially stretched product. Generally, the biaxially stretched article is suitable because of its better mechanical strength and gas-barrier property. The stretch ratios described above with regard to the stretched product of the polyhydroxy polyether may be applied directly to the stretching of the multilayer blow-molded article.

The stretched multilayer blow-molded article may be produced by stretch-blow molding the preform as stated above. For example, the preform at the aforesaid stretching temperature is stretched in the longitudinal direction, and then blow-molded thereby to stretch it in the transverse direction (biaxial stretch-blow molding).

The stretched multilayer blow-molded article can be used in various applications because of its excellent mechanical strength, heat resistance, gas-barrier property and transparency. The biaxially stretched multilayer blow-molded container has excellent gas-barrier property and is suitable for holding seasonings, oils, wines and liquors, beer, carbonated beverages, juices, cosmetics, detergents, etc. For holding beer or carbonated beverages, the wall thickness of this conainer can be reduced, and the period within which to taste the contents can be prolonged.

The polyhydroxy polyether of this invention may also be used as an additive for improving the gas-barrier property of the polyalkylene terephthalates. The proportion of the polyhydroxy polyether to be added for this purpose is usually 2 to 500 parts by weight, preferably 3 to 300 parts by weight, especially preferably 5 to 100 parts by weight, per 100 parts by weight of the polyalkylene terephthalate.

A stretched film of the polyhydroxy polyether of this invention may be used, for example, for electrical insulation or as magnetic tapes, photographic films and metal vapor-deposited films.

The following examples illustrate the present invention more specifically.

In these Examples and Comparative Examples, all parts are by weight, and the various properties were evaluated by the following methods.

The composition of the polyhydroxy polyether was determined by measuring its nuclear magnetic resonance spectrum.

The intrinsic viscosity of the polyhydroxy polyether was measured at 25° C. in o-chlorophenol.

The glass transition temperature of the polyhydroxy polyether was measured by means of a differential scanning calorimeter at a temperature elevating rate of 10° C./min. using a resin sample obtained by heating the polymer to a molten and flowable state and then rapidly cooling it to room temperature.

As regards the gas-barrier property of a sheet, stretched film of stretched bottle of the polyhydroxy polyether or its laminate, the coefficient of oxygen permeation was measured at 25° C. by means of OXTRAN device (made by MOCON company), and the coefficient of carbon dioxide permeation was measured at 25° C. by means of PERMATRAN C-IV made by MOCON company.

EXAMPLE 1

Hydroquinone (220.2 parts), 34.8 parts of ethylene glycol diglycidyl ether (DENACOL EX-810, a tradename for a product of Nakase Chemical Industry Co., Ltd.), 340 parts of methyl ethyl ketone and 1.6 parts of N,N-dimethylbenzylamine were fed into a reaction vessel and reacted at 118° C. for 5 hours with stirring. The reaction mixture was cooled to room temperature, and 300 parts of methyl isobutyl ketone, 510 parts of distilled water, 48 parts of trimethyl benzyl ammonium chloride, 170.6 parts of epichlorohydrin and 165.2 parts of a 50% aqueous solution of sodium hydroxide were added in this sequence. The temperature was then raised again, and the mixture was maintained at 80° C. for 3 hours and then at 90° C. for 3 hours. The viscosity of the reaction mixture rose with time. After the reaction, 160 parts of acetic acid was added to the reaction mixture to neutralize the product. On standing, the mixture separated into a lower aqueous layer and an upper oil layer containing the polyhydroxy polyether formed by the reaction. The aqueous layer was removed. The viscosity of the oil layer was adjusted with acetic acid and methyl isobutyl ketone, and thereafter, the oil layer was poured into a large amount of methanol to precipitate the polyhydroxy polyether. The polyhydroxy polyether was washed with methanol and water, and dried under vacuum at 40° C. The amount of the resulting polyhydroxy polyether was 339 parts. The polymer had an intrinsic viscosity of 0.65 dl/g and a glass transition temperature 57° C. The mole ratio of the hydroquinone units to the ethylene glycol units in this polymer was 91:9.

A press sheet having a thickness of about 100 microns was prepared from the polyhydroxy polyether, and its gas-barrier property was measured. The sheet was found to have a coefficient of carbon dioxide permeation of 0.81 ml.mm/m$^2$.day.atm and a coefficient of oxygen permeation of 0.16 ml.mm/m$^2$.day.atom.

EXAMPLES 2–4

In each run, a polyhydroxy polyether was produced in the same way as in Example 1 except that the amounts of ethylene glycol diglycidyl ether, epichlorohydrin and the 50% aqueous solution of sodium hydroxide were changed as shown in Table 1.

The amount of the polyhydroxy polyether yielded, its intrinsic viscosity, glass transition temperature and hydroquinone unit/ethylene glycol unit molar ratio, and the coefficients of carbon dioxide and oxygen permeation of the press sheet are summarized in Table 1.

TABLE 1

| Example | Amounts of the starting materials (parts) | | | Properties of the polyhydroxy polyether | | | | |
|---|---|---|---|---|---|---|---|---|
| | Ethylene glycol diglycidyl ether | Epi-chloro-hydrin | 50% Aqueous NaOH solution | Amount yielded (parts) | Intrinsic viscosity (dl/g) | Mole ratio of hydroquinone units to ethylene glycol units | Glass transition temperature (°C.) | Coefficient of CO$_2$ permeation (ml · mm/ m$^2$ · day · atm) | Coefficient of O$_2$ permeation (ml · mm/ m$^2$ · day · atm) |
| 2 | 13.9 | 179.3 | 175 | 324 | 0.74 | 96:4 | 58 | 1.1 | 0.25 |
| 3 | 104.5 | 141.9 | 137.4 | 382 | 0.56 | 77:23 | 55 | 0.69 | 0.15 |
| 4 | 172.2 | 113.1 | 109.6 | 421 | 0.48 | 67:33 | 50 | 0.67 | 0.12 |

EXAMPLE 5

Hydroquinone and ethylene glycol diglycidyl ether were reacted at 130° C. for 2 hours in the same way as in Example 1 using 278.7 parts of ethylene glycol diglycidyl ether and 340 parts of cyclohexanone in place of methyl isobutyl ketone. Then, 150 parts of cyclohexanone was added, and the mixture was reacted at 150° C. for 2 hours. The reaction mixture was cooled to room temperature, and 300 parts of cyclohexanone, 300 parts of distilled water, 48 parts of trimethyl benzyl ammonium chloride, 41.1 parts of epichlorohydrin, and 67.8 parts of a 50% aqueous solution of sodium hydroxide were added. The mixture was reacted and worked up in the same way as in Example 1 to give 490 parts of a polyhydroxy polyether. The resulting polymer had an intrinsic viscosity of 0.43 dl/g, a glass transition temperature of 47° C., and a hydroquinone unit/ethylene glycol unit mole ratio of 56:44.

A press sheet prepared from the polyhydroxy polyether in the same way as in Example 1 had a coefficient of carbon dioxide permeation of 0.78 ml.mm/m$^2$.day.atm.

COMPARATIVE EXAMPLE 1

Hydroquinone (220.2 parts), 185.1 parts of epichlorohydrin, 600 parts of methyl isobutyl ketone, 510 parts of distilled water, 48 parts of trimethyl benzyl ammonium chloride and 179.2 parts of a 50% aqueous solution of sodium hydroxide were fed into a reaction vessel, and reacted with stirring at 80° C. for 3 hours and then at 90° C. for 3 hours. The viscosity of the reaction mixture rose with time. After the reaction, the reaction mixture was worked up in the same way as in Example 1 to give 322 parts of a polyhydroxy polyether. The polymer had an intrinsic viscosity of 0.81 dl/g and a glass transition temperature of 56° C. The composition of this polymer agreed with that of a product obtained by alternately dehydrocondensing hydroquinone and 2-hydroxy-1,3-propanediol.

A press sheet prepared from the resulting polyhydroxy polyether in the same way as in Example 1 had a coefficient of carbon dioxide permeation of 1.9 ml.mm/m$^2$.day.atm, and a coefficient of oxygen permeation of 0.37 ml.mm/m$^2$.day.atm.

COMPARATIVE EXAMPLE 2

Hydroquinone (220.2 parts), 448 parts of ethylene glycol diglycidyl ether, 800 parts of cyclohexanone and 3.2 parts of N-dimethylbenzylamine were fed into a reaction vessel, and reacted with stirring at 120° C. for 1 hour, at 130° C. for 2 hours and then at 150° C. for 2 hours. After the reaction, the reaction mixture was worked up in the same way as in Example 1 to give 514 parts of a polyhydroxy polyether. The polymer had an intrinsic viscosity of 0.29 dl/g, a glass transition temperature of 32° C., and a hydroquinone unit/ethylene glycol unit mole ratio of 44:56. A press sheet prepared from the polyhydroxy polyether in the same way as in Example 1 contained many foams so that it could not be subjected to a carbon dioxide or oxygen gas permeation test.

EXAMPLE 6

Hydroquinone and ethylene glycol diglycidyl ether were reacted in the same way as in Example 1 except that 340 parts of cyclohexanone as used instead of methyl isobutyl ketone and the reaction temperature was changed to 130° C. Distilled water, trimethyl benzyl ammonium chloride, epichlorohydrin and a 50% aqueous solution of sodium hydroxide were added to the reaction mixture and the reaction was carried out at 90° C. for 4 hours in the same way as in Example 1 except that 300 parts of cyclohexanone was added instead of methyl isobutyl ketone. The viscosity of the reaction mixture rose and the power for the stirring increased. Hence, 200 parts of cyclohexanone was further added portionwise, and the reaction was continued at 90° C. for 4 hours while suppressing the rising of the viscosity of the reaction mixture. After the reaction, the reaction mixture was worked up in the same way as in Example 1 to give 342 parts of a polyhydroxy polyether. The polymer had an intrinsic viscosity of 1.58 dl/g, a glass transition temperature of 57° C., and a hydroquinone unit/ethylene glycol unit mole ratio of 91:9.

A press sheet prepared from the polyhydroxy polyether in the same way as in Example 1 had a coefficient of carbon dioxide permeation of 0.78 ml.mm/m$^2$.day.atm.

EXAMPLE 7

A polyhydroxy polyether (336 parts) was produced in the same way as in Example 1 except that acetophenone was used instead of methyl isobutyl ketone; tetra-n-butyl ammonium chlodide was used instead of trimethyl benzyl ammonium chloride; and the reaction of hydroquinone and ethylene glycol diglycidyl ether was carried out at 130° C. The polymer had an intrinsic viscosity of 0.47 dl/g, a glass transition temperature of 56° C., and a hydroquinone unit/ethylene glycol unit mole ratio of 91:9. A press sheet prepared from the polyhydroxy polyether in the same way as in Example 1 had a coefficient of carbon dioxide permeation of 0.80 ml.mm/m$^2$.day.atm.

EXAMPLE 8

Hydroquinone (220.2 parts), 34.8 parts of ethylene glycol diglycidyl ether, 640 parts of cyclohexanone and 48 parts of trimethyl benzyl ammonium were fed into a reaction vessel, and reacted at 95° C. for 2 hours with stirring. Epichlorohydrin (170.6 parts) and 675 parts of a 12.2% aqueous solution of sodium hydroxide were added, and the reaction was continued at 95° C. for 4 hours to give 324 parts of a polyhydroxy polyether. The polymer had an intrinsic viscosity of 0.58 dl/g, a glass transition temperature of 57° C., and a hydroquinone unit/ethylene glycol unit mole ratio of 91:9.

A press sheet prepared from the polyhydroxy polyether in the same way as in Example 1 had a coefficient of carbon dioxide permeation of 0.79 ml.mm/m$^2$.day.atm.

EXAMPLES 9-14

In each run, a polyhydroxy polyether was produced in the same way as in Example 1 except each of the diglycidyl ethers of alkylene glycols or polyalkylene glycols indicated in Table 2 was used in the amount indicated instead of ethylene glycol diglycidyl ether; the amount of epichlorohydrin was changed as shown in Table 2; cyclohexanone was used instead of methyl isobutyl ketone; the 50% aqueous solution of sodium hydroxide was used in each of the amounts indicated in Table 2; and hydroquinone and the diglycidyl ether were reacted at 130° C. for 4 hours. Table 2 summarizes the amount yielded, intrinsic viscosity, glass transition temperature, and hydroquinone unit/alkylene glycol or polyalkylene glycol unit mole ratio of the polyhydroxy polyether and the coefficient of carbon dioxide permeation of a press sheet prepared from the polyhydroxy polyether as in Example 1.

TABLE 2

| Example | Alkylene glycol diglycidyl ether or polyalkylene glycol diglycidyl ether kind | Amount (parts) | Amount of epichlorohydrin (parts) | Amount of 50% aqueous NaOH solution (parts) | Amount of polyhydroxy-polyether yielded (parts) | Properties of the polyhydroxy polyether ||||
|---|---|---|---|---|---|---|---|---|---|
| | | | | | | Intrinsic viscosity (dl/g) | Glass transition temperature (°C.) | Mole ratio of hydroquinone units to alkylene glycol or polyalkylene glycol units | Coefficient of CO$_2$ permeation (ml · mm/ m$^2$ · day · atm) |
| 9 | Propylene glycol diglycidyl ether (DENACOL EX-911*) | 37.7 | 173.4 | 168 | 342 | 0.69 | 51 | 91:9 | 0.94 |
| 10 | Propylene glycol diglycidyl ether (DENACOL EX-911*) | 188.2 | 127.0 | 123 | 430 | 0.57 | 48 | 77:23 | 1.1 |
| 11 | Neopentyl glycol diglycidyl ether (DENACOL EX-211*) | 43.9 | 170.6 | 165 | 349 | 0.67 | 57 | 91:9 | 1.2 |
| 12 | Diethylene glycol diglycidyl ether | 43.7 | 172.0 | 166 | 342 | 0.69 | 52 | 91:9 | 0.85 |

TABLE 2-continued

| Example | Alkylene glycol diglycidyl ether or polyalkylene glycol diglycidyl ether | | Amount of epichlorohydrin (parts) | Amount of 50% aqueous NaOH solution (parts) | Amount of polyhydroxypolyether yielded (parts) | Properties of the polyhydroxy polyether | | | |
|---|---|---|---|---|---|---|---|---|---|
| | kind | Amount (parts) | | | | Intrinsic viscosity (dl/g) | Glass transition temperature (°C.) | Mole ratio of hydroquinone units to alkylene glycol or polyalkylene glycol units | Coefficient of $CO_2$ permeation (ml · mm/ $m^2$ · day · atm) |
| 13 | Polyethylene glycol diglycidyl ether (DENACOL EX-851*) (DENACOL EX-841*) | 140.4 | 168.6 | 163 | 408 | 0.79 | 43 | 91:9 | 0.96 |
| 14 | Polypropylene glycol diglycidyl ether (DENACOL EX-920*) | 60.1 | 169.6 | 164 | 350 | 0.68 | 44 | 91:9 | 1.2 |

*Tradenames for products of Nagase Chemical Industry Co., Ltd.

EXAMPLES 15–17

In each run, a polyhydroxy polyether was produced in the same way as in Example 1 except that hydroquinone was used in each of the amounts indicated in Table 3; each of the aromatic diols indicated in Table 3 was used in the amount indicated in Table 3 together with hydroquinone; cyclohexanone was used instead of methyl isobutyl ketone; and the reaction of the hydroquinone, aromatic diol and ethylene glycol diglycidyl ether was carried out at 130° C. for 4 hours. Table 3 summarizes the amount yielded, intrinsic viscosity, glass transition temperature, hydroquinone unit-/aromatic diol unit/ethylene glycol unit mole ratio of the polyhydroxy polyether and the coefficient of carbon dioxide permeation of a press sheet prepared from the polymer in the same way as in Example 1.

TABLE 3

| Example | Aromatic diol | | Amount of hydroquinone used (parts) | Amount yielded of the polyhydroxy polyether (parts) | Properties of the polyhydroxy polyether | | | |
|---|---|---|---|---|---|---|---|---|
| | kind | Amount (parts) | | | Intrinsic viscosity (dl/g) | Glass transition temperature (°C.) | Mole ratio of hydroquinone units/aromatic diol units/ethylene glycol units | Coefficient of $CO_2$ permeation (ml · mm/ $m^2$ · day · atm) |
| 15 | P,P'—biphenol | 37.2 | 198.2 | 359 | 0.62 | 69 | 82:9:9 | 0.82 |
| 16 | 4,4'-dihydroxydiphenyl sulfone | 50.1 | 198.2 | 368 | 0.72 | 79 | 82:9:9 | 0.92 |
| 17 | 4,4'-methylenebis-(2,6-dimethylphenol) | 25.6 | 209.2 | 352 | 0.61 | 76 | 86:5:9 | 0.91 |

EXAMPLES 18–10 AND COMPARATIVE EXAMPLE 3

A press sheet having a thickness of about 200 microns was prepared from each of the polyhydroxy polyethers obtained in Examples 1, 4 and 11 and Comparative Example 1. The press sheet was simultaneously stretched to 3 times both in the longitudinal and transverse directions at about 70° to 95° C. to prepare a biaxially stretched film having an average thickness of about 22 microns. The coefficient of carbon dioxide permeation of the biaxially oriented film is shown in Table 4.

TABLE 4

| Example (Ex.) or Comparative Example (CEx.) | Polyhydroxy polyether used for stretching | Coefficient of carbon dioxide permeation of the biaxially stretched film (ml · mm/$m^2$ · day · atm) |
|---|---|---|
| Ex. 18 | Ex. 1 | 0.76 |
| Ex. 19 | Ex. 4 | 0.65 |
| Ex. 20 | Ex. 11 | 1.0 |
| CEx. 3 | CEx. 1 | 1.6 |

EXAMPLE 21

The same polyhydroxy polyether as in Example 1 was produced in a large quantity by the same method as in Example 1.

The polyhydroxy polyether was extrusion-molded at about 150° to 180° C. by an extruder equipped with a T-die to form an extruded sheet having a thickness of about 200 microns. The extruded sheet was stretched simultaneously to about 3 times in the longitudinal direction (parallel to the extrusion) and the transverse direction (perpendicular to the extrusion) at about 70° to 85° C. to form a biaxially stretched film having a thickness of about 22 microns. The resulting film had a coefficient of carbon dioxide permeation of 0.78 ml.mm/$m^2$.day.atm.

EXAMPLE 22

The press sheet obtained in Example 18 was superimposed on a press sheet of polyethylene terephthalate (Mitsui PET J015, a tradename) having a thickness of about 200 microns, and the assembly was compressed to form a multilayer press sheet having a thickness of about 350 microns. In the press sheet, the adhesion between the polyhydroxy polyether layer and the polyethylene terephthalate layer was good.

The multilayer press sheet was simultaneously stretched biaxially under the same conditions as in Example 18 to form a biaxially stretched film having an average thickness of 40 microns. The polyhydroxy polyether layer had a thickness of about 18 microns, and the polyethylene terephthalate layer had a thickness of about 22 microns. The adhesion between the polyhydroxy polyether layer and the polyethylene terephthalate layer of the biaxially stretched film was good. The biaxially stretched film had a coefficient of carbon dioxide permeation of 1.6 ml.mm/$m^2$.day.atm.

COMPARATIVE EXAMPLE 4

A biaxially stretched film having a thickness of about 22 microns was prepared by biaxially stretching the press sheet of polyethylene terephthalate used in Example 18 in the same way as in Example 18. The film had a coefficient of carbon dioxide permeation of 15 ml.mm/$m^2$.day.atm.

EXAMPLE 23

Polyethylene terephthalate (Mitsui PET J015, a tradename) was injection-molded, and then the polyhydroxy polyether obtained in Example 21 was injection-molded to prepare a preform composed of a polyethylene terephthalate layer and a polyhydroxy polyether layer each having a thickness of about 1.6 mm. The preform was heated to 85° to 90° C. by a heating device using far infrared rays, and stretched to about 2.5 times longitudinally and about 4.3 times by a stretch-blow molding machine to form a stretched bottle having an inner capacity of about 1 liter in the thinnest portion of which the polyethylene terephthalate layer had a thickness of about 150 microns or the polyhydroxy polyether layer was about 150 microns. The stretched bottle had a cofficient of oxygen permeation of 0.10 ml.mm/$m^2$.day.atm, and a coefficient of carbon dioxide permeation of 0.42 ml.mm/$m^2$.day.atm.

COMPARATIVE EXAMPLE 5

A preform composed only of a polyethylene terephthalate layer having the same thickness (about 3.2 mm) as the preform of Example 23 was prepared by injection molding the same polyethylene terephthalate as used in Example-23 (Mitsui PET J015, a tradename). The preform was stretch-blow molded as in Example 23 to prepare a stretched bottle having an inner capacity of about 1 liter in which the thinnest portion had a thickness of about 300 microns. The stretched bottle had a coefficient of oxygen permeation of 1.10 ml.mm/$m^2$.day.atm, and a coefficient of carbon dioxide permeation of 4.0 ml.mm/$m^2$.day.atm.

EXAMPLE 24

Polyethylene terephthalate (Mitsui PET J125, a tradename) was melted in an extruder. Separately, the polyhydroxy polyether obtained in Example 23 was melted in another extruder. The molten polymers were supplied to a three-layer pipe die and extruded into a three-layer pipe composed of polyethylene terephthalate/polyhydroxy polyether/polyethylene terephthalate (thickness about 1.2/1.2/1.2 mm). The pipe was cooled with water to give a three layer pipe having an outside diameter of 24.8 mm and a thickness of 3.6 mm. The pipe was cut off, and one end was heat-melted to form a bottom portion. The other end was similarly heat-melted and formed into a spigot portion. Thus, a preform having a total length of 16.5 cm and a weight of about 50 g was obtained.

The preform was biaxially stretched to 2.5 times longitudinally and 4 times transversely by means of a biaxial stretch-blow molding machine (LB01 made by Corpoplast Company) to obtain a multilayer container composed of polyethylene terephthalate/polyhydroxy polyether/polyethylene terephthalate each in a thickness of about 120 microns having an inner capacity of 1.5 liters. The multilayer container had an oxygen permeability of 0.17 ml/day.bottle.atm, and a carbon dioxide permeability of 0.58 ml/day.bottle.atm.

Water at 0° C. was filled in the container, but the container did not break nor was delaminated.

EXAMPLE 25

A reaction vessel equipped with a stirrer and a refluxing device was charged with 220.2 parts of hydroquinone, 334.2 parts of hydroquinone diglycidyl ether (epoxy content 8.98 eq./kg, terminal hydroxyl group content 20 eq/$10^6$ g), 112.5 parts of ethylene glycol diglycidyl ether, 1.8 parts of triphenylphosphine and 280 parts of cyclohexanone. After the inside of the vessel was fully purged with nitrogen, the mixture was reacted at 130° C. for about 3 hours in an atmosphere of nitrogen with stirring. The temperature was then raised to 150° C., and the reaction was continued for about 2 hours. The viscosity of the reaction mixture rose with time. After the reaction, the reaction mixture was poured in particulate form portionwise into acetone to precipitate the resulting polymer. The polymer was washed with acetone and recovered by filtration, followed by drying at 40° C. under vacuum. The resulting polymer was a polyhydroxy polyether having an intrinsic viscosity of 1.23 dl/g and a glass transition temperature of 60° C.

EXAMPLES 25-31

In each run, a polyhydroxy polyether having hydroquinone as a main component was produced in the same way as in Example 25 except that each of the diglycidyl ethers indicated in Table 5 was used in the amount indicated in Table 5, and the reaction conditions were changed as shown in Table 5. Table 5 summarizes the mole ratio of the diol units of the polyhydroxy polyether and the intrinsic viscosity and glass transition temperature of the polyhydroxy polyether.

TABLE 5

| | Diglycidyl ether | | | Reaction conditions | | | | Properties of the polyhydroxy polyether | | |
| | Amount of hydroquinone | | | 1st stage | | 2nd stage | | | | Glass |
| Example | diglycidyl ether (parts) | other diglycidyl ether | | Temperature (°C.) | Time (hr) | Temperature (°C.) | Time (hr) | Mole ratio of the diol units | Intrinsic viscosity (dl/g) | transition temperature (°C.) |
| | | kind | Amount (parts) | | | | | | | |
| 25 | 334.2 | Ethylene glycol diglycidyl ether | 112.0 | 130 | 3.0 | 150 | 2.0 | Hydroquinone: ethylene | 1.23 | 60 |

TABLE 5-continued

| | Diglycidyl ether | | | Reaction conditions | | | | Properties of the polyhydroxy polyether | | |
|---|---|---|---|---|---|---|---|---|---|---|
| | Amount of hydroquinone | other diglycidyl ether | | 1st stage | | 2nd stage | | | Intrinsic | Glass transition |
| Example | diglycidyl ether (parts) | kind | Amount (parts) | Temperature (°C.) | Time (hr) | Temperature (°C.) | Time (hr) | Mole ratio of the diol units | viscosity (dl/g) | temperature (°C.) |
| 26 | 111.4 | Ethylene glycol diglycidyl ether (DENACOL EX-810*) | 336.0 | 130 | 3.0 | 150 | 2.5 | Hydroquinone: ethylene glycol = 83:17 | 0.76 | 50 |
| 27 | 334.2 | Propylene glycol diglycidyl ether (DENACOL EX-911*) | 150.0 | 130 | 3.0 | 150 | 2.0 | Hydroquinone: propylene glycol = 54:46 | 1.23 | 58 |
| 28 | 334.2 | Neopentyl glycol diglycidyl ether (DENACOL EX-211*) | 140.0 | 130 | 3.0 | 150 | 2.0 | Hydroquinone: neopentyl glycol = 85:15 | 1.15 | 58 |
| 29 | 111.4 | Neopentyl glycol diglycidyl ether (DENACOL EX-211*) | 420.0 | 130 | 3.0 | 150 | 3.0 | Hydroquinone: neopentyl glycol = 87:13 | 0.72 | 53 |
| 30 | 334.2 | Diethylene glycol diglycidyl ether (DENACOL EX-851*) | 154.0 | 130 | 3.0 | 150 | 3.0 | Hydroquinone: diethylene glycol = 60:40 | 1.09 | 57 |
| 31 | 401.0 | Polyethylene glycol diglycidyl ether (DENACOL EX-841*) | 110.4 | 130 | 3.0 | 150 | 3.0 | Hydroquinone: polyethylene glycol = 85:15 | 0.81 | 56 |

*Tradenames for products of Nagase Chemical Industry Co., Ltd.

EXAMPLES 32-35

In each run, a polyhydroxy polyether was produced in the same way as in Example 25 except that the amount of hydroquinone used was changed as shown in Table 6; each of the aromatic diols indicated in Table 6 was used in the amount indicated; the amount of hydroquinone diglycidyl ether was changed as shown in Table 6; each of the diglycidyl ethers indicated in Table 6 was used in the amount indicated; and the reaction conditions were changed as shown in Table 6. Table 6 summarizes the mole ratio of the diol units of the polyhydroxy polyether, and the intrinsic viscosity and the glass transition temperature of the polyhydroxy polyether.

TABLE 6

| | Aromatic diol | | | Diglycidyl ether | | |
|---|---|---|---|---|---|---|
| | | other aromatic diol | | Amount of hydroquinone diglycidyl | other glycidyl ether | |
| Example | Amount of hydroquinone | kind | Amount (parts) | ether (parts) | kind | Amount (parts) |
| 32 | 165.2 | p,p'-biphenol | 43.1 | 304.2 | Ethylene glycol diglycidyl ether (DENACOL EX-810*) | 112.0 |
| 33 | " | " | " | 222.8 | Ethylene glycol diglycidyl ether (DENACOL EX-810*) | 224.0 |
| 34 | " | " | " | 334.2 | Ethylene glycol diglycidyl ether (DENACOL EX-810*) | 112.0 |
| 35 | " | " | " | 222.8 | Ethylene glycol diglycidyl ether (DENACOL EX-810*) | 224.0 |

| | Reaction conditions | | | | Properties of the polyhydroxy polyether | | |
|---|---|---|---|---|---|---|---|
| | 1st stage | | 2nd stage | | Mole ratio | Intrinsic | Glass transition |
| Example | Temperature (°C.) | Time (hr) | Temperature (°C.) | Time (hr) | of the diol units | viscosity (dl/g) | temperature (°C.) |
| 32 | 130 | 3.0 | 150 | 2.5 | Hydroquinone: p,p'-biphenol: ethylene glycol = 71:12:17 | 1.11 | 65 |
| 33 | 130 | 3.0 | 150 | 3.0 | Hydroquinone: p,p'-biphenol: ethylene glycol = 57:11:32 | 0.83 | 56 |
| 34 | 130 | 3.0 | 150 | 2.5 | Hydroquinone: 4,4'-dihydroxydiphenyl sulfone:ethylene glycol = 71:12:32 | 1.14 | 74 |
| 35 | 130 | 3.0 | 150 | 3.0 | Hydroquinone: 4'-dihydroxydiphenyl sulfone:ethylene | 0.76 | 65 |

EXAMPLE 36

Ten parts of the polyhydroxy polyether produced by the method of Example 1 was mixed with 100 parts of polyethylene terephthalate (Mitsui PET J 125, a tradename) which had been dried at 150° C. for 10 hours. The mixture was melt-extruded by an extruder at a molding temperature of about 250° C., cooled and cut to form pellets of a composition composed of polyethylene terephthalate and the polyhydroxy polyether. The pellets were compression-molded to form a press sheet having a thickness of about 100 microns. The press sheet was colorless and transparent. The gas-barrier property of the press sheet was measured, and the results are shown in Table 7.

EXAMPLES 37-38 AND COMPARATIVE EXAMPLE 6

Example 36 was repeated except that the amount of the polyhydroxy polyether per 100 parts of polyethylene terephthalate was changed as indicated in Table 7. The results are also shown in Table 7.

TABLE 7

| | Amount (parts) of the polyhydroxy polyether per 100 parts of polyethylene terephthalate | Coefficient of carbon dioxide permeation (ml · mm/m2 · day · atm) |
|---|---|---|
| Example 36 | 10 | 17 |
| Example 37 | 40 | 11 |
| Example 38 | 80 | 8.3 |
| Comparative Example 6 | 0 | 25 |

What is claimed is:

1. A substantially linear polyhydroxy polyether, which
   (1) is composed substantially of aromatic units represented by the following formula (I)-A

(I)-A wherein $R^1$ represents a divalent aromatic hydrocarbon group composed mainly of a p-phenylene group,
   and aliphatic units represented by the following formula (I)-B

(I)-B wherein $R^2$ represents a divalent aliphatic hydrocarbon group having 2 to 6 carbon atoms, and p is a positive number of from 1 to 20,
   the proportion of the aromatic units being 50 to 98 mole % based on the total amount of the aromatic units and the aliphatic units,
   (2) has an intrinsic viscosity, measured at 25° C. in o-chlorophenol, of from 0.3 to 2 dl/g, and
   (3) has a glass transition temperature of from 30° to 120° C.

2. The polyhydroxy polyether of claim 1 wherein the proportion of the aromatic units is 55 to 97 mole % based on the total amount of the aromatic units and the aliphatic units.

3. The polyhydroxy polyether of claim 1 wherein the intrinsic viscosity is 0.4 to 1.5 dl/g.

4. The polyhydroxy polyether of claim 1 wherein the glass transition temperature is in the range of 40° to 110° C.

5. The polyhydroxy polyether of claim 1 which has a weight average molecular weight ($\overline{M}w$)/number average molecular weight ($\overline{M}n$) ratio, ($\overline{M}w/\overline{M}n$), of from 1.5 to 10.

6. A process for producing the polyhydroxy polyether of claim 1, which comprises reacting
   (a) a polyhydroxy polyoxide represented by the general formula (II)

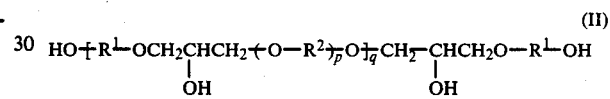

(II)

wherein $R^1$ represents a divalent aromatic hydrocarbon group composed of a p-phenylene group as a main component, $R^2$ represents a divalent aliphatic hydrocarbon group having 2 to 6 carbon atoms, p represents a positive number of from 1 to 20, and q is a positive number,
   (b) an aromatic diol represented by the following formula (III)

(III)

wherein $R^1$ is as defined above, and
   (c) an epihalohydrin, in a two-phase mixed solvent composed of water and an organic solvent in the presence of a base and/or a phase-transfer catalyst.

7. A process for producing the polyhydroxy polyether of claim 1, which comprises reacting
   (a') an aromatic diol represented by the general formula (III)

(III)

wherein $R^1$ represents a divalent aromatic hydrocarbon group composed of a p-phenylene group as a main component,
   (b') a diglycidyl ether of an aromatic diol represented by the general formula (IV)

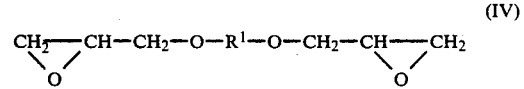

(IV)

wherein $R^1$ is as defined, and
   (c') a diglycidyl ether of an aliphatic diol represented by the general formula (V)

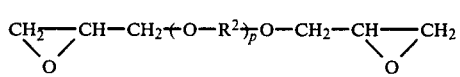
wherein $R^2$ represents a divalent aliphatic hydrocarbon group having 2 to 6 carbon atoms, and p is a positive number of from 1 to 20,
in the presence of at least one catalyst selected from the group consisting of tertiary amines, quaternary ammonium compounds, tertiary phosphines and quaternary phosphonium compounds.
* * * * *